INVENTOR
LOUIS LE BLAN
BY Fred M. Vogel
AGENT

June 25, 1963 L. LE BLAN 3,095,479

SIGNAL TRANSMISSION AND RECEIVING SYSTEM, MORE PARTICULARLY FOR USE IN TELEVISION

Filed Oct. 18, 1954 3 Sheets-Sheet 2

INVENTOR
LOUIS LE BLAN
BY Fred M. Vogel
AGENT

June 25, 1963 L. LE BLAN 3,095,479
SIGNAL TRANSMISSION AND RECEIVING SYSTEM, MORE PARTICULARLY FOR USE IN TELEVISION
Filed Oct. 18, 1954 3 Sheets-Sheet 3

INVENTOR
LOUIS LE BLAN
BY Fred M. Vogel
AGENT 3,095,479
Patented June 25, 1963

3,095,479

SIGNAL TRANSMISSION AND RECEIVING SYSTEM, MORE PARTICULARLY FOR USE IN TELEVISION

Louis Le Blan, Paris France, assignor, by mesne assignments, to North American Philips Company, Inc., New York, N.Y., a corporation of Delaware Filed Oct. 18, 1954, Ser. No. 462,996
Claims priority, application France Nov. 13, 1953
4 Claims. (Cl. 179—15)

Figure 1:
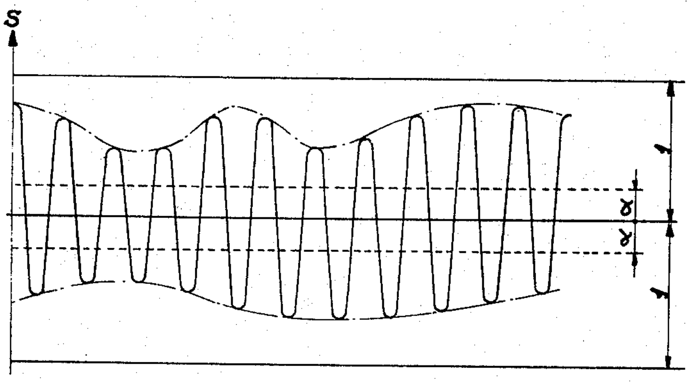

The present invention has for its object to provide a transmission system for electric signals, permitting the simultaneous transmission of two independent or not independent signals on a single carrier having generally unequal half periods and a fixed frequency, this carrier being termed the carrier wave, transmissible by radio, similar to the system described in patent application Serial No. 460,750, filed October 6, 1954, now Patent No. 2,907,830, and having the title of: "Signal Transmission System and More Particularly for Use in Television," and a receiving system for the said signals, permitting to carry out correctly and efficiently the separation and reproduction of the signals in an independent manner.

A principal object of the invention resides in the possibility of carrying out the simultaneous transmission of two signals without the necessity of subjecting them, at the transmitter end, to a cross-talk correction as provided, for example, in the aforesaid patent application.

A further object of the invention resides in the possibility of separating and reproducing correctly the transmitted signals without these signals being interfered with by cross-talk, owing to the reproduction of either the frequency of the auxiliary carrier wave or the frequency of sampling carried out at the transmitter end or a pilot signal derived from the reproduced frequencies and applied to the synchronization circuit of a local oscillator, producing a wave of the same frequency as the said auxiliary carrier or the said sampling signal.

In other words, if for example the transmission is carried out by periodical sampling of the signals to be transmitted by a signal of given frequency, the invention provides means permitting, at the receiver end, of reproducing the signals to be transmitted, for example also by periodical sampling by a signal derived directly from the signal received through the aerial of the receiver, having the same frequency as the sampling signal used at the transmitter end or by a signal produced locally, but synchronized by the signal derived from the signal received through the said aerial.

A preferred embodiment of the invention comprises a transmitter having means for producing a sampling signal which may be in the form of periodically recurring pulses. The sampling signal is fed to two modulator stages, and means are provided to cause the sampling signal which is fed to one of the modulator stages to be 180 degrees out-of-phase with the sampling signal which is fed to the other modulator stage. Two input signals which are to be transmitted, are fed respectively to the two modulator stages. The output signals of the two modulators are fed to a mixer where they are mixed with opposing polarity, thereby producing a carrier wave in which the positive excursions are amplitude modulated in accordance with one of the input signals and the negative excursions are amplitude modulated in accordance with the other input signal. This modulated carrier wave is fed to a receiver, either directly or by means of a modulated radio-frequency carrier wave. At the receiver, the modulated carrier is fed to two modulator stages which function as detectors. A sampling signal, similar to the sampling signal at the transmitter, is fed 180 degrees out-of-phase to these two modulator stages and is phased with respect to the carrier wave so that one modulator stage produces a demodulated signal in accordance with the amplitude modulation of the positive polarity excursions of the carrier wave and the other modulator stage produces a demodulated signal in accordance with the amplitude modulation of the negative-polarity excursions of the carrier wave. Thus, the two demodulated signals at the receiver are replicas of the two input signals at the transmitter. A further feature of the invention is the provision of means, in the receiver, for deriving the receiver's sampling signal in accordance with the frequency of the received carrier wave, thus insuring proper phase relationships of the input signals fed to the modulators in the receiver.

Figure 2:
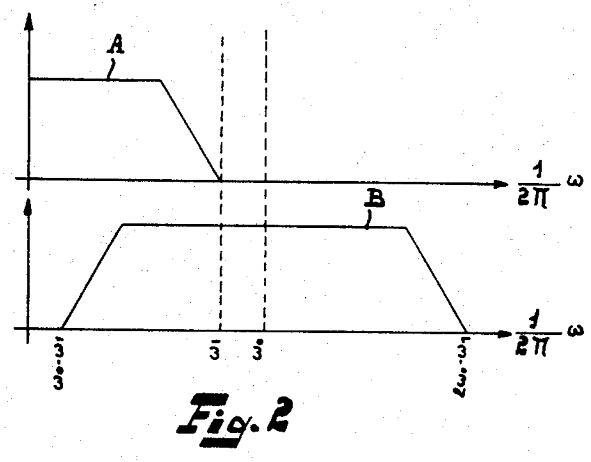
Figure 3:
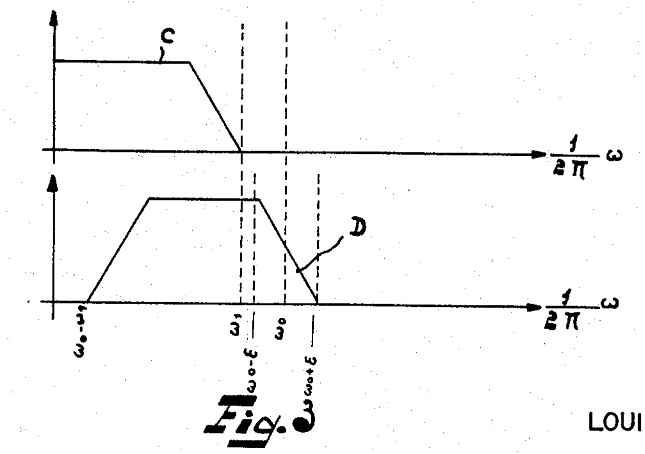
Figure 4:
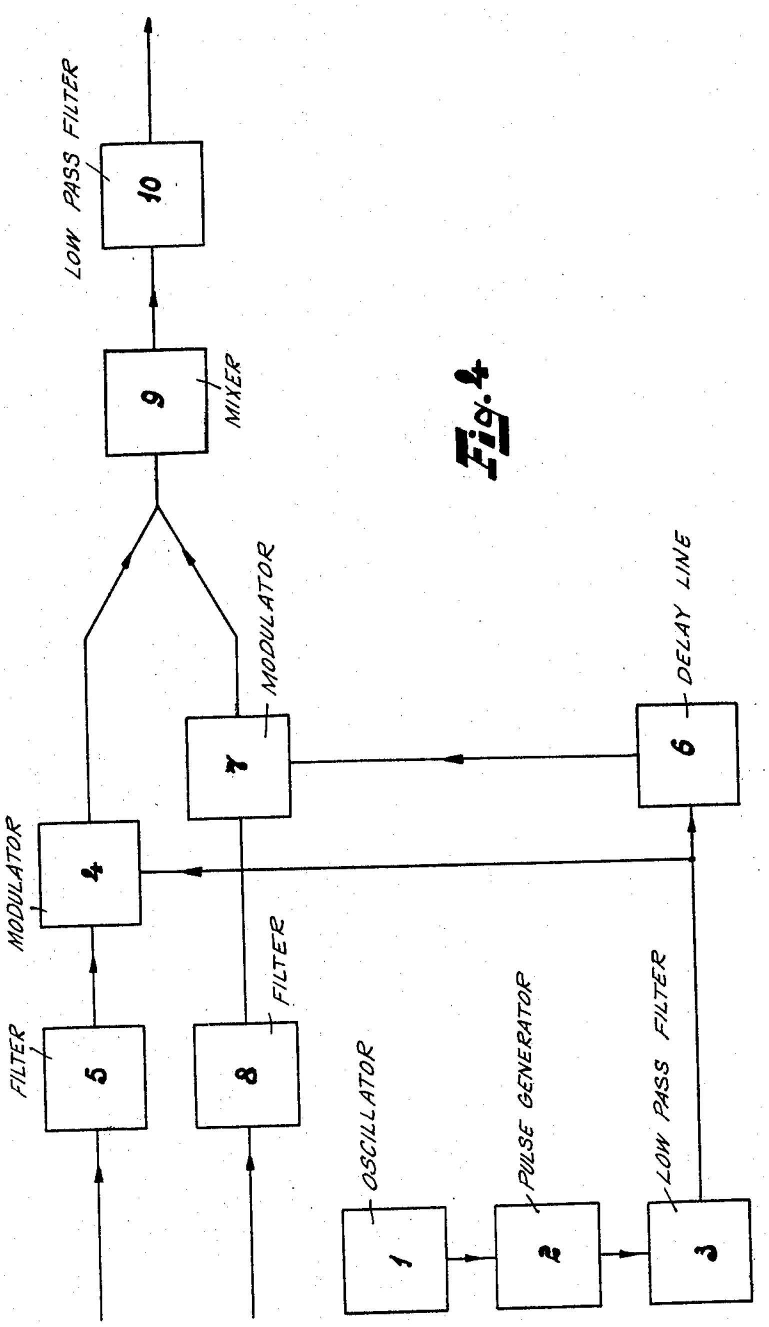
Figure 5:
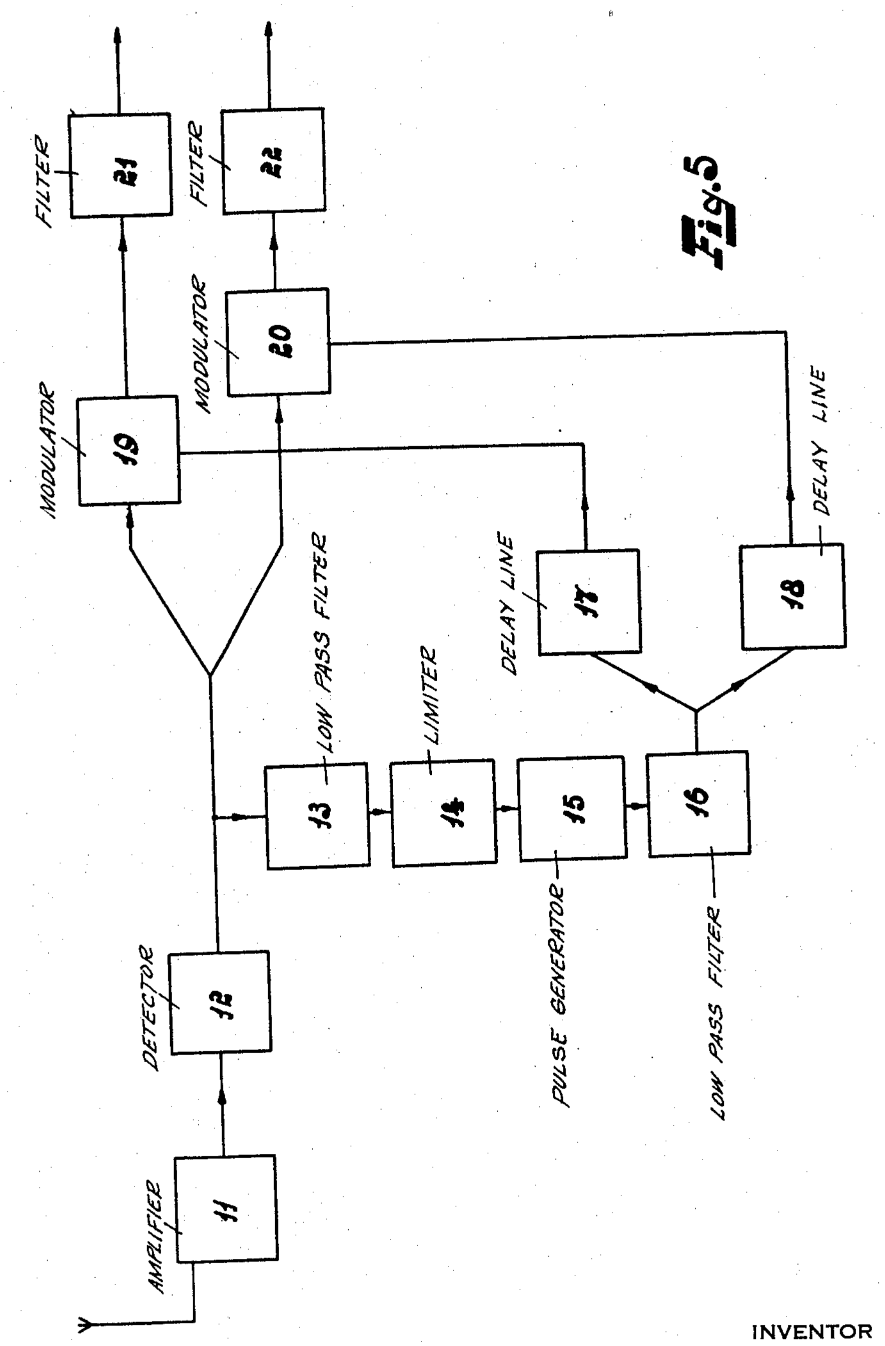

Other objects of the invention will be evident from or will be described in detail in the following description, together with the drawing in which FIG. 1 shows a carrier wave modulated by two initial signals, FIGS. 2 and 3 show preferred frequency spectral compositions of the initial signals, FIG. 4 is an electrical diagram of a transmitter in accordance with the invention, and FIG. 5 is an electrical diagram of a receiver in accordance with the invention.

In general, if various signals, designated hereinafter by the initial signals are to be transmitted simultaneously, it is known to use as a transmission agent a single signal successively equal (for accurate time values, forming as a rule a periodical series) to each of the initial signals to be transmitted.

Such transmission methods may, as is known, be used whenever it is not required to ensure a continuous transmission (or a transmission of all successive values) of each of the initial signals, the values of each of the signals not being known at the receiver end but for certain time intervals, forming preferably a periodical sequence. At a first approximation this is the case, if the spectrum of each of the signals to be transmitted lies within a limited frequency band.

The separation at the receiver end of the signals proportional to the initial signals from the actually incoming signal, which is proportional to the effectively transmitted signal, requires, in general, a comparatively accurate knowledge of the instants when the said transmitted signal is equal to any of the signals to be separated. This knowledge comes down on the one hand to that of the repetition frequency of the sequence of these instants and on the other hand (in order to locate in time the complete sequence for example by fixing the first of them) to that of a phase.

In order to simplify the following description, the incoming signal will be considered to be equal to the transmitted signal (whereas it is generally only proportional to it) and the signals finally derived from this incoming signal will be considered to be equal to the initial signals to be transmitted (whereas they are generally only proportional thereto). The factor of proportionality being the same for all these signals (at least on a first approximation which assume the use of stages and circuits having a linear response) there is no risk of ambiguity.

In the case of transmission by cable, in which the pass band may be comparatively large, auxiliary signals may be introduced, often without any objection, these signals permitting of detecting at the receiver end the frequency and the phase referred to above.

If the pass band in cable transmission is limited to a comparatively narrow limit or if the transmission occurs by radio, the introduction of these signals into this band may give rise to more or less serious difficulties.

In the particular case of simultaneous transmission of two initial signals various solutions have been suggested to avoid the necessity of the auxiliary transmission of the time values at which the signal serving as a transmission agent is equal to one or to the other of the two initial signals. In general, these solutions are physically similar to the case of the modulation of the positive peaks of a carrier by one of the signals and of the modulation of the negative peaks of the same carrier by the other signal to be transmitted.

However, a more accurate description of such a transmission method may be obtained by considering the transporting signal as a two-channel multiplex signal, having time-divided pulses.

By designating by $f_1(t)$ and $f_2(t)$ the two initial signals to be transmitted, the original values of each of them and the interval of their variations may be chosen arbitrarily, so that in a quite conventional manner they remain always between a value $\alpha$ (which lies between 0 and 1) and the unit. By $$\frac{N_0}{2}=\frac{1}{2}\frac{\omega_0}{2\pi}$$

is designated an upper limit of the frequencies lying in the spectra of $f_1$ and $f_2$; the two-channel multiplex signal is obtained by providing first, by known means, the quantity:

$$f_1(\tfrac{1}{2}+\cos\omega_0 t)-f_2(\tfrac{1}{2}-\cos\omega_0 t)$$

The band of the preceding signal is limited to the frequency $N_0\omega_0/2\pi$ by means of a low-pass filter, which supplies a new signal $\Sigma$, having positive parts and negative parts. For the time values:

$$t=2k\frac{\pi}{\omega_0}=\frac{k}{N_0}$$

$\Sigma$ is equal to $-f_2$. The general course of the signal $\Sigma$ as shown in FIG. 1 is approximately that of a sinusoidal course with amplitudes varying symmetrically, its positive half periods having the signal $f_1$ as their envelope and its negative half periods having the signal $f_2$ as their envelope ($f_1$ and $f_2$ being otherwise independent).

It has been suggested to separate the two initial signals $f_1$ and $f_2$ by separating first the positive half periods from the negative half periods of the transporting signal and applying in accordance with their respective polarities to two different channels the signals resulting from this first separation, the signals being finally detected in known manner. However, it is known that whatever the system of correspondence prevailing between the signals separated in accordance with their polarities and the initial signals transported by them may be, each of the signals obtained is, as a rule, affected by considerable interfering terms resulting mainly from the presence of the other signal. The influence of these interfering terms is usually termed "cross-talk."

In order to obviate this cross-talk the aforesaid patent application describes a method consisting in modifying previously at the transmitter end the initial signals to be transmitted by adding to them terms proportional to but opposite the cross-talk factors, so that finally at the receiver end signals are supplied in a pure state which signals may be directly used.

However, such a separation method for the signals at the receiver end is based on the accurate use of the level of the transmitted signal corresponding to the zero values either of $f_1$ or of $f_2$. If the propagation conditions are comparatively normal between the transmitter and the receiver, the receiver may be controlled so that a satisfactory separation is obtained. But this control varies with the amplitude of the incoming signal and it must be readjusted, if this amplitude exhibits excessive variations.

The present invention has for its object to provide a system for separating the initial signals to be transmitted, if there are two initial signals, transmitted by means of a "transporting signal," similar to signal $\Sigma$ referred to above. In practice the signal $\Sigma$ will be obtained from the initial signals $f_1$ and $f_2$ as indicated above or by another known method, resulting in signals which may be expressed by the same time functions.

When carrying out the invention, the relative variations of the initial signals $f_1$ and $f_2$ are confined within an interval $|\alpha, 1|$ in which $\alpha$ designates a number between 0 and the unit, but not being zero. By way of example, in order to give an idea, $\alpha$ will be equal to a few tenths e.g. $0.2 \leqslant\alpha\leqslant 0.3$).

In order to simplify the description, the scope and the possibilities of the invention being, however, not confined thereto, it is assumed that the spectrum of the frequencies of the initial signal $f_1$ and that of the initial signal $f_2$ is completely located within a frequency band having an upper limit at the frequency $N_1$, which $N_1$ is lower than, preferably slightly lower than, the frequency $N_0$, referred to above.

Under these conditions, by way of example, FIG. 2 shows the spectral composition of the signal $$s_1=f_1(t)$$

In this figure the curve A indicates the limits permitted for the energy distribution of the first term of $s_1$ or $f_1(t)/2$, whereas the curve B indicates the same distribution for the second term of $s_1$, or $$f_1(t)\cdot\cos\omega_0 t$$

If, as a rule and as indicated above, the frequency band of the aforesaid signal is limited to an upper value of $N_0=\omega_0/2\pi$ by means of a low-pass filter, the attenuation of which is such that the ordinate of the curve B of FIG. 2 on the abscissa point $N_0$ is equal to only 50% of the ordinate of its horizontal porch, the energy distribution of the said signal is modified as indicated in FIG. 3. In this figure curve C which is identical with the curve A of FIG. 2 indicates the limits permitted for the energy distribution of the first term $f_1/2$, whereas the curve D indicates that of the second term $f_1 \cos\omega_0 t$ of $s_1$. Of course, with the representation of FIG. 3 it is supposed that the low-pass filter, fixing the upper limit of the frequency band to $N_0$, has an exactly linear attenuation. In practice, it is known that it is difficult to obtain such an attenuation, therefore, in general, the attenuation curve is caused to be approximately symmetrical with respect to the abscissa point $N_0$, which is at the same time the centre and the inflexion point.

From the above it is evident that the signal $S=s_1+s_2$ may be considered from the point of view of the contribution of one of the signals to be transmitted, for example only $f_1$ as being formed by two terms. One $f_1/2$ reproduces with an approximately constant coefficient this initial signal, the other represents the modulation spectrum of a carrier by the said signal $f_1$ to be transmitted. This modulation spectrum is completely contained within the signal S, i.e. it has therein two complete sidebands, which are symmetrical to the frequency of the carrier $N_0=\omega_0/2\pi$. The conversion of the signal S into the signal Σ is characterized by the transformation of the second term of S, $f_1 \cdot \cos \omega_0 t$, into a modulation spectrum in one sideband, the band retained being then the band which is lower in frequency.

The same properties apply evidently to the contribution of the initial signal $f_2$ to the signals S and Σ. The spectral representation of the complete signal may also be illustrated by FIG. 3. To this end it suffices to consider that the curve C of this figure represents the energy distribution for the terms $(f_1/2-f_2/2)$ of Σ, whereas the curve D represents the lower sideband of the modulated wave:

$$\cos \omega_0 t(f_1+f_2)$$

Owing to the limitation to $N_1=\omega_1/2\pi$ of the transmitted band, provided especially for $f_1$ and $f_2$ in order to obtain a simplified embodiment of the invention, the part of the band occupied by the signal Σ, corresponding to the higher frequencies of Σ does not contain appreciable energy due to the term $(f_1/2-f_2/2)$. It contains, consequently only energy by the term $(f_1+f_2) \cos \omega_0 t$.

According to one aspect of the invention the signal Σ being used as a transmission agent either directly through a cable or for the modulation of a main carrier transmitted through an aerial, a filter having a comparatively narrow passband $2\eta$, adjusted to the frequency $N_0$ is provided at the receiver end, this filter thus selecting a narrow band about the frequency $N_0$ of the signal Σ, obtained subsequent to detection. Referring to FIG. 3, it is evident that the progressive attenuation range of the low-pass filter limiting the band of the signal Σ is $(N_0-\epsilon, N_0+\epsilon) \cdot \eta$ may, in general, be $\leqslant N_0-\epsilon$. The band of the filter will be $(N_0-\eta, N_0+\eta)$ with $$\eta < \begin{cases} \epsilon \\ N_0-N_1 \end{cases}$$

According to a preferred embodiment of the invention $\eta$ is chosen to be low with respect to $\epsilon$ so that the variation of the energy distribution of the signal Σ within the band $(N_0-\eta, N_0+\eta)$ may on a first approximation be considered to be negligible.

According to a further aspect of the invention the filter has a response curve to the modulation which is substantially symmetrical to $N_0$. Under these conditions the part of the signal Σ obtained at the output of the filter has all the known properties of an amplitude-modulated wave with two sidebands.

In the aforesaid case the modulated carrier wave is $\cos \omega_0 t$ and the modulation is formed by the components of $(f_1+f_2)$ contained in the band $(0, \eta)$.

Thus the initial signals $f_1$ and $f_2$ must remain each within the interval $(\alpha, 1)$. It is known that such a condition of limitation is obtained with sufficient approximation, if the bands of $f_1$ and $f_2$ are limited to any value lower than or equal to $N_1$.

Under these conditions the signal obtained at the output of the filter occurs, but for the delay produced by the filter, in the form of a wave $\cos \omega_0 t$ modulated in amplitude, the maximum amplitudes of which do not exceed 2, whereas the minimum amplitudes are never lower than $2\alpha$. Owing to the symmetrical spectral structure of this signal the zero values are obtained for $$t=(2k+1)/2\times\pi/\omega_0$$

According to the invention this property is used for the reproduction in the receiver of the wave $\cos \omega_0 t$.

Two cases are considered, accordingly as the components of the initial signals $f_1$ and/or $f_2$, contained in the frequency band $(0, \eta)$, correspond to a comparatively negligible or not negligible energy contribution. In the first case the modulation of the wave $\cos \omega_0 t$ at the output of the filter is also negligible and it becomes possible to identify the output signal of this filter by this wave (but for a constant coefficient). This signal may then be directly used, for example to ensure at the receiver and the exploration of the signal obtained through the aerial by periodical sampling.

In the second case the components of $f_1$ and/or $f_2$ in the frequency band $(0, \eta)$, being considerable, a non-negligible amplitude modulation of the output signal of the filter is left, so that the direct use of this signal is not feasible. It is known that there are numerous known means to obtain the reproduction of a wave of given frequency and phase without amplitude modulation (or with negligible amplitude modulation), if previously a wave of the same frequency, modulated in amplitude is available, its spectrum being, however, symmetrical to the carrier frequency and the minimum amplitude in the "valleys" of the modulation not being too low with respect to the mean amplitude.

According to a further feature of the invention the auxiliary modulated wave supplied by the filter is employed for example to ensure the synchronization of a local oscillator, which is previously adjusted to the frequency $N_0$. Under these conditions this wave extracted from the complex signals transmitted by the transmitter serves as a pilot signal for the local oscillator which supplies a signal serving for example for the exploration of the signal obtained through the aerial by periodical sampling.

According to a further feature of the invention the signal from the filter may be passed through one or more so-called limiting stages, for example the stages commonly used in frequency-modulation receivers to suppress or at least to reduce the parasitic amplitude modulation of the incoming signal. The signal finally obtained is a pilot signal which can ensure the synchronization and/or the phase control of the local oscillator by known means.

The invention finally provides means for obtaining a reproduced carrier having a frequency $N_0$ and accurately constant amplitude and an accurately determined mean phase. By a suitable arrangement of the circuits it may always be ensured that the residual phase modulation following the amplitude modulation of the pilot signal is sufficiently low to be negligible.

According to a further feature of the invention (a preferred feature) smoothing of the half periods (positive or negative) of the signal supplied by the filter or of the pilot signal may be performed; this smoothing is carried out on the one hand on a positive level relative to the average axis of the signal and on the other hand on a negative level. These two levels must be as symmetrical as possible relative to the mean axis of the signal. In these conditions, provided a sufficient number of these smoothing operations are carried out successively on sufficiently intermediate smoothing levels, a signal is finally obtained having a rectangular waveform. Properly speaking, this signal can never be identified by a signal having a fundamental period of $2\pi/\omega_0$. It is known that the initial amplitude modulation gives always rise to interference. However, the circuits may be arranged in a manner such that these interferences are reduced to a negligible level and that the signal obtained at the output of the smoothing stages is substantially similar to a rectangular signal having a centre of symmetry and a fundamental period of $2\pi/\omega_0$. The phase of this signal is related intimately to the phase of the carrier having the frequency $N_0=\omega_0/2\pi$ of the pilot signal.

According to the invention the initial signals $f_1$ and $f_2$ are obtained by known means from the signal Σ, supplied by the receiver, which requires the knowledge of the sampling frequency $N_0$ used at the transmitter end and of a reference phase. In contradistinction to what takes place in general in the known systems, the knowledge of this frequency is completely due to the signal received through the receiver aerial, from which signal it is derived in the manner described.

For example use may be made of a simple reproduced carrier having a frequency $N_0$ and a phase which is suitably controlled to carry out the multiplication of the signal Σ at the receiver and by $1+\cos\omega_0 t$, which supplies $f_1$, subsequent to suitable limitation of the band of the product. The simultaneous multiplication of the signal by $-\{½-\cos\omega_0 t\}$ supplies in the same manner $f_2$.

According to the invention use may be made for such operations of the rectangular signal obtained previously, by subtracting therefrom by means of a filter having a comparatively narrow passband and adjusted to the frequency $N_0$, the pure carrier having the frequency $N_0$. As an alternative, use may be made, for example in known manner of the very short pulses, the repetition frequency of which is also $N_0$.

These pulses may be obtained by known means from the frequency of the reproduced carrier. They may, more particularly, be obtained from the rectangular signal described above (for example by differentiation of these rectangular signals).

In general, the invention may be used in all cases in which the pulses are produced by any device capable of causing to correspond, with a fixed phase shift, a short pulse to each zero value of the pilot signal.

A suitable delay will be obtained in a pulse series as described above, so that at the receiver end the instants of the suitably delayed pulses coincide with the time values for which the signal Σ is for example equal to the pulse $f_1$. Thus a series of pulses is obtained which, by multiplication of the signal Σ and suitable limitation of the band of the product, supplies the initial signal $f_1$ in its pure state.

From this first series, by the introduction of a delay of a half period a new pulse series may be produced, the instants of which coincide with the time values for which the signal Σ is equal to the initial signal $f_2$. Sampling of the signal Σ by this pulse sequence supplies in the same manner the signal $f_2$ in the pure state.

In the foregoing description, for the sake of simplicity, we have confined ourselves to the case in which the spectrum of the signals $f_1$ and $f_2$ to be transmitted lies completely within a band lying between the frequencies 0 and $N_1 \leqslant N_0$ (FIG. 2). In this case, the spectrum of the signal has a symmetrical structure relative to the frequency $N_0$, or approximately to this frequency or at least within the band $(N_0-\eta, N_0+\eta)$, described above. Owing to this symmetry the pilot signal has zero values which are exactly periodical and frequencies $N_0$.

It is, however, evident that the invention is not restricted to this case.

It may occur, for example, that components of $f_1$ or of $f_2$ prevail in the band $(N_0-\eta, N_0+\eta)$; then the zero values of the piloted signal do not admit a fixed periodicity $1/N_0=2\pi/\omega_0$, but have a mean periodicity of $1/N_0$. The phase of the zero values of the pilot signal is thus modulated as a function of the aforesaid components. However, if this phase modulation remains within comparatively low limits, it does not give rise to practical difficulties.

It may on the contrary occur that the limitation to $N_1=\omega_1/2\pi$ of the spectrum of the signals $f_1$ and $f_2$ is an excessive condition, which must be avoided.

In this case it is sufficient at the transmitter end to produce the signal Σ from the initial signals $f_1$ and $f_2$ to be transmitted by multiplying them not by signals which may be represented by the functions:

$$½+\cos\omega_0 t \text{ (for } f_1) \text{ and } ½-\cos\omega_0 t \text{ (for } f_2)$$

but by signals which may be represented by the functions $$½+\cos\omega_0 t+\cos 2\omega_0 t \text{ (for } f_1)$$

and $$½-\cos\omega_0 t+\cos 2\omega_0 t \text{ (for } f_2)$$

By way of example we consider hereinafter the case in which the spectrum of $f_1$ and/or of $f_2$ extends up to the upper value $N_2=\omega_0/2\pi$, for example $\omega_0<\omega_2<1.5\omega_0$.

Under these conditions the first term of the product of $f_1$ by the function of sampling i.e. $f_1 \cos\omega_0 t$ has a symmetrical spectrum relative to the frequency $\omega_0$, at least within the band $(0.5\omega_0, -1.5\omega_0)$.

The same applies to the second term $f_1(½+\cos 2\omega_0 t)$, i.e. a component $\gamma\cos pt$ of $f_1$ with $0.5\omega_0<p<1.5\omega_0$.

For the second term the component $$\gamma\cos pt\left(½+\cos 2\omega_0 t\right)=\frac{\gamma}{2}\cos pt+\frac{\gamma}{2}\cos(2\omega_0-p)t+\frac{\gamma}{2}\cos(2\omega_0+p)t$$

results.

There is no reason to consider in this product the term having the frequency $2\omega_0+p$, which will not be maintained in Σ and is located beyond the band $(0.5\omega_0-1.5\omega_0)$. The two remaining terms are exactly symmetrical radians relative to the frequency $N_0=\omega_0/2\pi$.

The same applies to $f_2$. If use is made of the low pass filter, which limits to $N_0$ (with a reduction in amplitude of 50% this frequency), the attenuation zone of the filter provides a progressive variation of the amplification, which renders the spectrum unsymmetrical. In order to utilize the symmetry properties obtained by the aforesaid means, the invention provides two ways. The filter extending the spectrum of the pilot signal has a band $(N_0-\eta, N_0+\eta)$ which is comparatively small relative to $N_0$, so that the variations of the amplification of the low-pass filter determining Σ is negligible in this band. Or the band $(N_0-\eta, N_0+\eta)$ is not sufficiently narrow to render the preceding approximation acceptable; in this case the channel supplying the pilot signal comprises in series a correction circuit, the amplification factor of which increases rapidly enough with frequency, so that in the band $(\omega_0-\eta, \omega_0+\eta)$ the product of the amplification factor of the low-pass filter, extending by the amplification factor of the correction circuit, is little variable and may be considered to be substantially constant.

If at the transmitter end use is made of sampling signals designated by the functions $$½+\cos\omega_0 t+\cos 2\omega_0 t \text{ and } ½-\cos\omega_0 t+\cos 2\omega_0 t$$

it is efficient to use similar signals for the sampling carried out in the case in which the transmitted band of the initial signals $f_1$ and $f_2$ reaches or exceeds the frequency $N_0$. Use may, as an alternative, be made, both at the transmitter end and at the receiver end, of sampling signals containing in addition to the aforesaid terms harmonics exceeding the second, if the low-pass filter or any equivalent device suppresses or attenuates the effect of these additional terms.

FIGS. 4 and 5, given by way of example without limitation, show a particular embodiment of the invention for the most general case in which the spectrums of the signals to be transmitted $f_1$ and/or $f_2$ cover a frequency band, of which the upper limit is not materially lower than $N_0$.

FIG. 4 shows the members intended for "the production" of the modulation signal of the transmitter from the initial signals $f_1$ and $f_2$. The arrangement comprises an oscillator 1, producing a sinusoidal signal having a frequency $N_0$, which may be designated arbitrarily by $\cos\omega_0 t$. This oscillator excites a pulse generator 2, producing very short pulses of a substantially rectangular waveform, having a repetition frequency equal to $N_0$.

Of course, all adjustments for any delay, carried out by known means (not shown), are effected in a manner such that the pulses from the generator 2 are produced at the time values $$t=\frac{2k\pi}{\omega_0}=\frac{k}{N_0}$$

It is known that a series of such pulses may be written in a Fourier series $$½+\cos\omega_0 t+\cos 2\omega_0 t+\ldots$$

The pulses from the generator 2 are applied through a low-pass filter 3, the cut-off frequency of which lies between $2N_0$ and $3N_0$, for example at $2.5N_0$. This filter suppresses in the pulse spectrum the harmonics exceeding the second.

Thus at the output a signal will be produced, which may be designated by the function:

$$\tfrac{1}{2}+\cos \omega_0 t+\cos 2\omega_0 t$$

This pulse signal is used as a sampling function of the initial signal $f_1$ to be transmitted in a multiplying or modulating stage 4, receiving the signal $f_1$ from the filter 5 (limiting the frequency band of the latter).

By means of a delay line 6, producing a delay equal to half the period $1/N_0=2\pi/\omega_0$, a second pulse signal $$\tfrac{1}{2}-\cos \omega_0 t+\cos 2\omega_0 t$$

is produced, which is used as a sampling function of the second initial signal $f_2$ to be transmitted in a multiplying or modulating stage 7, receiving the signal $f_2$ from the low-pass filter 8.

It is understood that all known devices which may produce a phase-shift of $\pi$ radians in the signal from the filter 3, may be substituted for the delay line 6. The mixer 9 adds in opposition the signals supplied by the multipliers 4 and 7, the output signal of 7 being, for example, subsequent to reversal of polarity, added to the output signal of 4.

The low-pass filter 10 is intended to fix the upper limit of the transmitted frequency band to $N_0=\omega_0/2\pi$. The output signal of this filter may be used directly to modulate the transmitter part feeding the aerial in the case of radio transmission.

FIG. 5 shows the corresponding devices according to the invention at the receiver end for the transmission method referred to above. The signal received through the receiver aerial excites a high-frequency amplifying circuit 11 which, if desired, may be combined with one or more frequency-changing devices. The output signal of 11 excites then a detector stage 12, which supplies the transmitted amplitude modulation. This amplitude modulation reproduces the signal $\Sigma$, i.e. the modulation signal of the transmitter, if the transmission conditions are satisfactory.

According to the invention, the signal $\Sigma$ from the output of the detector 12 is used mainly for three different purposes.

In the first place it is applied via a low-pass filter 13, the passband of which $(\omega_0-\eta, \omega_0+\eta)$; this low-pass filter has a responsive curve which is quite symmetrical relative to its medium frequency $N_0=\omega_0/2\pi$, both in modulation and in phase. The signal selected by the filter 13 is applied via a limiting device 14, adjusted in a manner such that it introduces limiting levels both for the positive peaks of the applied signal and for its negative peaks, these limiting levels being symmetrical relative to the mean axis of the applied signal.

On the other hand the distance of the limiting levels from the mean axis must be sufficiently small to ensure that all the half periods of the applied signal are efficiently limited, so that the signal obtained from the output of 14 will be a rectangular signal, at least approximately. This rectangular signal excites a pulse generator 15, which can supply pulses substantially identical with those supplied by the generator 2 at the transmitter end (see FIG. 4).

These pulses have a repetition frequency $N_0$ and are produced in a series of discontinuities of the rectangular signals applied (for example during the intervals between the negative porches and the positive porches of the rectangular signals applied to the input of the generator 15). The pulses thus obtained traverse a low-pass filter 16, intended to suppress the harmonics of the spectrum exceeding the second. To this end the cut-off frequency of the low-pass filter may lie for example between $2N_0$ and $3N_0$ and may be equal to $2.5N_0$ (in order to give an idea).

From the output of the low-pass filter 16 the pulses feed two delay lines 17 and 18 intended to introduce each a delay such that at their respective outputs a pulse series is obtained, of which the medium instants coincide with the time values at which the signal $\Sigma$ is equal to $f_1$ and $f_2$ respectively.

Thus the delay line 17 supplies the signal $$\tfrac{1}{2}\cos \omega_0 t+\cos 2\omega_0 t$$

used as a sampling function for the signal $f_1$ at the receiver end; subsequent to multiplication of the signal $\Sigma$ by this sampling signal in the multiplier 19, the initial signal $f_1$ is reproduced.

The delay line 18 supplies the second signal $$\tfrac{1}{2}\cos \omega_0 t+\cos 2\omega_0 t$$

used as a sampling function for the signal $f_2$ at the receiver end; subsequent to multiplication of the signal $\Sigma$ by this sampling signal in the multiplier 20, the second initial signal $f_2$ is also reproduced.

FIG. 5 shows also two low-pass filters 21 and 22, after the multipliers 19 and 20. These filters free the reproduced initial signals $f_1$ and $f_2$ from the signals, the components of which have a frequency higher than $N_0$.

In the preceding description it has been assumed that the signals used as sampling functions at the receiver end in the multiplying stages 19 and 20 (FIG. 5) are preferably but not necessarily identical with the sampling signals used at the transmitter end in the multiplier stages 4 and 7 (FIG. 4). Similarly, the low-pass filters used at the receiver end have, preferably but not necessarily the same transmission characteristics as those used at the transmitter end. Thus, preferably, the filter 16 of FIG. 5 has the same characteristics as the corresponding filter 3 of FIG. 4 and the filters 21 and 22 of FIG. 5 have preferably the same characteristics as the corresponding filters 5 and 8 of FIG. 4.

In the patent application filed October 6, 1954, by the applicant, referred to above, it has been set out that in order to obtain at the receiver end a "continuous" reproduction of the initial signals $f_1$ and $f_2$, it is necessary that the transmitted frequency bands to transmit these signals should be limited in their upper values to $N_0/2$. If, on the contrary, these signals or only one of them previously to sampling, extends in a frequency band, the upper value of which exceeds $N_0/2$ or even $N_0$, it is known that the signals reproduced at the receiver end have a dot structure due to the sequential nature of the transmission.

It is common practice to designate such a transmission method in technical literature by the expression "dot-sequential transmission." The sequential character under the aforesaid conditions does not permit the complete reproduction of one of the two initial signals $f_1$ or $f_2$, but it does permit the reproduction if they have a periodical character of a periodicity lower than $2\pi/\omega_0$.

Under these conditions, it is known that the transmission may be carried out by means of a suitable value of $N_0$, in a manner such that the "dot" structure, affecting the said signals $f_1$ and $f_2$ at the receiver end, is interlaced during two successive periods of each of them.

Then, by using a sensitive final device capable of performing the integration of the result of the reception during at least two successive periods or by any other means having the same properties, an impression or a result may be obtained, which is exactly similar to that obtained if each of the initial signals $f_1$ and $f_2$ are transmitted continuously.

The foregoing description will be better understandable, if it is considered that the invention has a more general character and also if it is used in the particular case shown in FIGS. 4 and 5 for the transmission of any magnitude, more particularly those referring to addition or sight.

It should be noted that the invention may be used for telephone or musical transmission. In this case a particular embodiment consists in that the band of the two acoustical signals to be transmitted is restricted to the value $N_0/2$. For example, in the case of commercial telephony $N_0/2$ may be 3 kc./s., or $N_0=6$ kc./s. The cut-off frequency of the low-pass filter, limiting the signal $\Sigma$, will thus be 6 kc./s.

In the present case it will not be necessary to introduce into the sampling functions terms in cos $2\omega_0 t$.

From the transmitter arrangement shown in FIG. 4 the generator 2 and the low-pass filter 3 may be omitted for such a transmission. Similarly, at the receiver end the pulse generator 15 and the low-pass filter 16 may be replaced by a single low-pass filter having a cut-off frequency between $N_0$ and $2N_0$, for example equal to $1.5N_0$. The passage of the rectangular signal supplied by the limiting device 14 via this filter will produce a voltage free from all harmonics exceeding the second.

The filters 21 and 22 have a cut-off frequency $N_0/2$ which is the upper value of the band of the initial signals $f_1$ and $f_2$ to be transmitted. Then the receiver supplies these signals in a continuous and simultaneous manner without any interference.

The invention may also be used with the transmission of two signals of the kind permitting image television; $f_1$ and $f_2$ may for example be more or less complex video signals.

With colour television for example it is known that a satisfactory reproduction of the object to be transmitted may be obtained by using three independent video signals, which correspond each with one of the three trichrome signals referred to above. Under these conditions it has been stated that it may be advantageous to transmit two video signals having accurately equal bands, the common value of these bands being approximately that used for black-and-white television of the same standard. These two video signals or two linear combinations thereof may be transmitted sequentially, since the signals to be transmitted are of a pseudo-periodical nature if the motions of the object are not too rapid. $f_1$ and $f_2$ are then similar to the two said video signals or to their linear combinations (independent or not independent).

According to the system described in the patent application of October 6, 1954, of the applicant, referred to above, for the transmission of the signals $f_1$ and $f_2$ and according to the system according to the present invention for their transmission and reception, it is not at all necessary that these signals should correspond only to two monochromatic components of an object or of a scene to be transmitted, having these colours. The invention is not at all restricted to this particular case and may particularly be used for black-and-white image television. In one case, for example, the two initial signals $f_1$ and $f_2$ correspond to two different video signals from the same object or the same scene, produced by two optically spaced cameras, which thus produce images giving the impression of relief at the receiver end. In a further case, for example, the two initial signals $f_1$ and $f_2$ correspond to two different video signals, which are completely independent and emanate from two different scenes (which may be located at different places), thus permitting of obtaining, at user's will the images of two transmissions, i.e. of two different programs which can be received with the same main carrier (i.e. via the same transmission channel).

Of course, in carrying out the invention the reproduction of the sampling signals or that of the pilot signals is subtracted from the signal received through the aerial and the variations of the output or of the control of the transmitter and variations of the propagation conditions as well as variations of the quality of the receiver are not reproduced. To this end for example at the output of the low-pass filter having a passband $N_0-\eta$, $N_0+\eta$ cutting off the sampling signal or the pilot signal, any known system (not shown in FIG. 5) is provided to ensure automatic compensation of the various fluctuations of the said signal, which is maintained between predetermined limits. By way of explanation we state that such a system, which does not form part of the invention, may operate as the conventional anti-fading system.

Finally, it is obvious that numerous variants of embodiments, known to those skilled in the art, relative to the arrangement of the various members or to their assembly, are possible within the scope of the invention.

I claim:

1. A system for transmitting and receiving two simultaneous input signals, comprising a transmitter having a source of said two signals and means for producing a carrier wave of which the positive-polarity excursions are amplitude modulated by one of said input signals and of which the negative-polarity excursions are amplitude modulated by the other of said input signals, a receiver, and means for transmitting said modulated carrier wave to said receiver, said receiver comprising means for producing from said modulated carrier wave an alternating sampling signal synchronized with the frequency of said carrier wave, and two demodulator means respectively connected to periodically sample, under the control of said sampling signal, the amplitudes of said positive-polarity excursions and of said negative-polarity excursions, thereby reproducing both of said input signals, said demodulator means comprising a pair of demodulator stages, means for feeding the received carrier wave as an input to said demodulator stages, and means for feeding said sampling signal as a second input to said demodulator stages, the sampling signal which is fed to one of said demodulator stages being in phase with the positive-polarity excursions of said carrier wave and the sampling signal which is fed to the other of said demodulator stages being in phase with the negative-polarity excursions of said carrier wave.

2. A system as claimed in claim 1, in which said means for producing an alternating sampling signal comprises a limiter connected to limit both of the positive and negative excursions of the received carrier wave, and a pulse generator connected to be controlled by the limited carrier wave.

3. A system for transmitting and receiving two simultaneous input signals comprising a transmitter and a receiver, said transmitter comprising a source of two input signals, a source of carrier oscillations, means deriving from said carrier oscillations a first sampling signal that is a function of cos $2\pi ft$ and a second sampling signal that is a function of $-$cos $2\pi ft$, where $f$ is the frequency of said carrier oscillations, means modulating one of said input signals by said first sampling signal, means modulating the other of said input signals by said second sampling signal, means adding said modulated input signals, and means transmitting said added signals, said receiver comprising means receiving said added signals, means deriving from said added signals a third sampling signal that is a function of cos $2\pi ft$ and a fourth sampling signal that is a function of $-$cos $2\pi ft$, and means separately modulating said added signals by said third and fourth sampling signals to reproduce said input signals.

4. A system for transmitting and receiving two simultaneous input signals, comprising a transmitter having a source of said two signals and means for producing a carrier wave of which the positive-polarity excursions are amplitude modulated by one of said input signals and of which the negative-polarity excursions are amplitude modulated by the other of said input signals, a receiver, and means for transmitting said modulated carrier wave to said receiver, said receiver comprising means for producing from said modulated carrier wave an alternating sampling signal synchronized with the frequency of said carrier wave, and two demodulator means respectively connected to periodically sample, under the control of said sampling signal, the amplitudes of said positive-polarity excursions and of said negative-polarity excursions, thereby reproducing both of said input signals, said receiver means for producing a sampling signal comprising a limiter stage connected to limit the amplitude of the received carrier wave.

References Cited in the file of this patent

UNITED STATES PATENTS

| | | |
|---|---|---|
| 1,652,092 | Clement | Dec. 6, 1927 |
| 1,742,902 | Deloraine et al. | Jan. 7, 1930 |
| 1,807,510 | Clement | May 26, 1931 |
| 1,906,269 | Hough | May 2, 1933 |
| 1,914,570 | Jenkins | June 20, 1933 |
| 2,262,764 | Hull | Nov. 18, 1941 |
| 2,395,615 | Curtis | Feb. 26, 1946 |
| 2,405,845 | Pfaff | Aug. 13, 1946 |
| 2,497,693 | Shea | Feb. 14, 1950 |
| 2,607,035 | Levine | Aug. 12, 1952 |
| 2,907,820 | Teer | Oct. 6, 1959 |
| 2,907,830 | Bountry et al. | Oct. 6, 1959 |